Jan. 17, 1961 W. F. EUBANKS 2,968,061
PROCESS FOR OPENING BELLIES OF FISH
Original Filed Aug. 1, 1958 3 Sheets-Sheet 1

INVENTOR
William F. Eubanks

BY Mawhinney & Mawhinney
ATTORNEY

Jan. 17, 1961  W. F. EUBANKS  2,968,061
PROCESS FOR OPENING BELLIES OF FISH
Original Filed Aug. 1, 1958  3 Sheets-Sheet 2
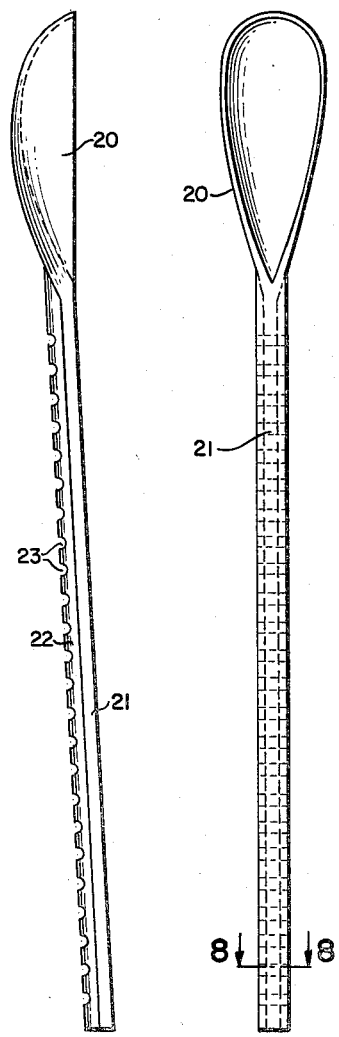
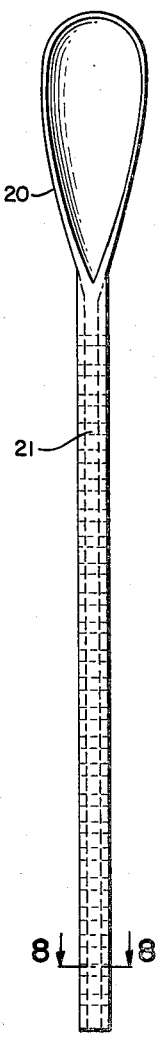
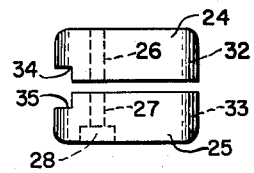
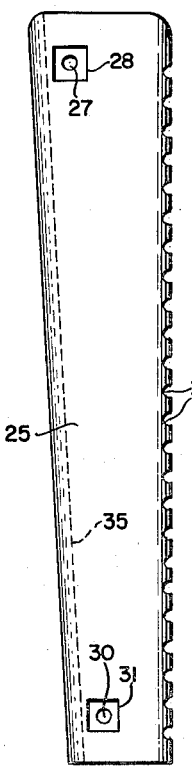
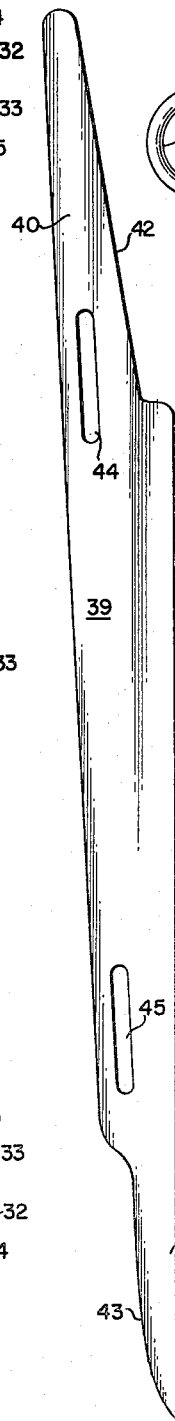
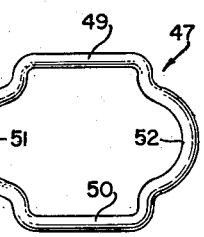
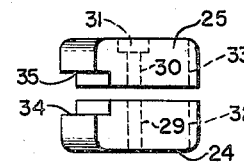
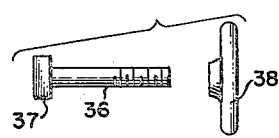
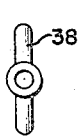
FIG.6.  FIG.7.  FIG.8.  FIG.9.  FIG.10.  FIG.11.  FIG.12.  FIG.13.  FIG.14.  FIG.15.  FIG.16.
INVENTOR
William F. Eubanks
BY Mawhinney & Mawhinney
ATTORNEY Jan. 17, 1961   W. F. EUBANKS   2,968,061
PROCESS FOR OPENING BELLIES OF FISH
Original Filed Aug. 1, 1958   3 Sheets-Sheet 3

INVENTOR
William F. Eubanks

BY Mawhinney & Mawhinney
ATTORNEY

United States Patent Office 2,968,061
Patented Jan. 17, 1961

2,968,061

PROCESS FOR OPENING BELLIES OF FISH

William F. Eubanks, Box 954, Vero Beach, Fla.

Original application Aug. 1, 1958, Ser. No. 752,469. Divided and this application May 21, 1959, Ser. No. 818,498

3 Claims. (Cl. 17—45)

The present invention relates to process for opening bellies of fish and more particularly female shad and the like for the purpose of recovering without mutilation the roe or capsular enclosure.

This application is a division of my application, Serial No. 752,469, filed August 1, 1958.

The process will also be found applicable to cod, haddock and other fish, the anatomies of which pose a somewhat more simple problem than in the matter of recovery of roe from shad.

It is an object of the invention to provide a process for the quick, easy and economical removal of roe from female shad and the like where the roe is intact and is thus able to command the highest price in the market.

It is another object of the invention to provide a process or method of so operating upon shad and the like by a series of steps that will both remove the roe without mutilation but which will also generally preserve the remainder of the carcass of the fish for its further commercial value as a food product.

The invention may be carried out conveniently by the tool herein disclosed and described, or any other desired or applicable form of tool.

With the foregoing and other objects in view, the invention will be more fully described hereinafter, and will be more particularly pointed out in the claims appended hereto.

In the drawings, wherein like symbols refer to like or corresponding parts throughout the several views:

Figure 6 is an edge elevational view of a form of spoon used in connection with the invention.

Figure 7 is a front elevational view of such spoon.

Figure 8 is a cross sectional view through the shank of the spoon taken on the line 8—8 in Figure 7.

Figure 9 is a side elevational view of one of the handle sections.

Figure 10 is a top edge view of the two handle sections in disassembled condition taken from the upper end of the tool.

Figure 11 is a similar view taken from the butt end of the tool.

Figure 12 is an exploded view of a form of bolt and wing nut employed.

Figure 13 is a front elevational view of the nut.

Figure 14 is a plan view of a form of double knife employed.

Figure 15 is a plan view of a form of large resilient binding ring employed.

Figure 16 is a similar view of a small resilient binding ring.

Figure 1:
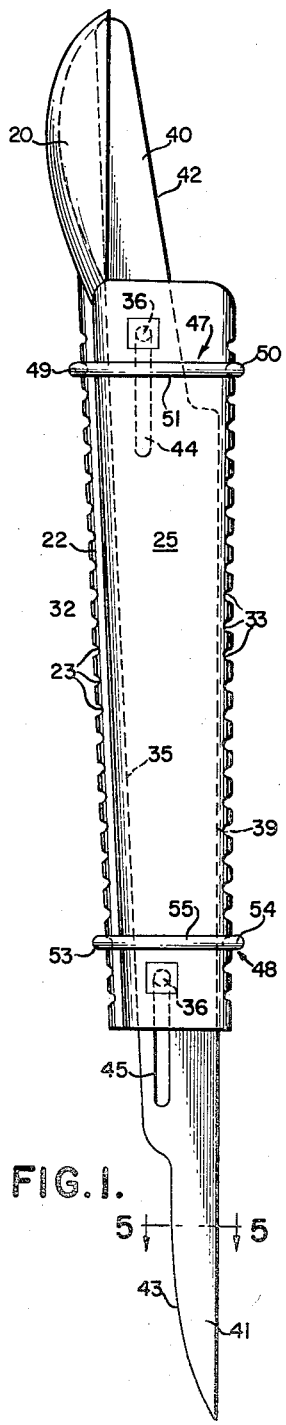
Figure 1 is a side elevational view of a tool constructed in accordance with the present invention and in assembled condition ready for use.

Referring more particularly to the drawings, and for the present to Figures 6, 7 and 8, 20 designates a spoon bowl, 21 the shank extending from the bowl and 22 a rib on the rear edge of the shank containing notches 23.

Referring more particularly to Figures 9, 10 and 11, a tapered handle is shown comprising handle sections 24 and 25. Near the large or spoon end of the handle sections 24 and 25 the same are pierced by registering bolt holes 26, 27 and one of the handle sections is provided with a countersunk recess 28 for a bolt head which is shown as square but may be made of other configuration.

Referring more particularly to Figure 9 which illustrates the smaller or butt end of the two handle sections 24 and 25, 29 and 30 represent registering bolt holes in the two sections and 31 designates a countersunk recess for a square or other configuration of bolt head.

It will be seen from Figure 9 that preferably both side edges of the handle sections 24 and 25 are tapering from the spoon end to the butt end.

The right hand edges of the handle sections 24 and 25 are provided with notches 32 and 33 and the left hand end of these handle sections are formed with angular recesses 34, 35 which together form a rectangular groove extending longitudinally of the handle in assembled relation to receive the shank 21 of the spoon.

Referring more particularly to Figures 12 and 13, bolts 36 are provided to enter the upper and lower bolt holes of the handle sections, there preferably being two such bolt holes and two bolts 36. The bolts are provided with heads 37 to be accommodated non-rotatively in the countersunk recesses 28 and 31. Wing or other nuts 38 are run on the screw threads of the bolts 36 to bind the handle sections 24 and 25 together.

Referring more particularly to Figure 14, 39 designates the tang of the cutting tool which is provided with cutting blades 40 and 41 at opposite ends. The spoon blade 40 projects beyond the upper end of the handle, while the butt blade 41 extends below the butt end of the handle. The blade 40 is provided with a sharp cutting edge 42 which is preferably inclined or tapered for a shearing cut. In similar manner the sharp cutting edge 43 of the extra blade 41 is inclined or rather rounded at its tip end after being substantially straight for the major part of its length. Slots 44 and 45 are provided in the tang 39, although parts of these slots may extend into the blades, such for instance as shown at the upper portion of the tang where the slot 44 extends partially into the upper spoon blade 40. These slots are elongated in the direction of the length of the handle 24, 25 and are positioned to receive therethrough the bolts 36. The longitudinally disposed slots 44 and 45 permit of an adjustment of the tang and blades longitudinally of the handle so as to expose desirable amounts of the cutting edges 42 and 43 beyond the ends of the handle for use in operating upon the fish. This longitudinal adjustment of the tang 39 and blades is desirable for positioning the upper blade 40 properly with respect to the concavity of the spoon bowl 20.

Figure 4:
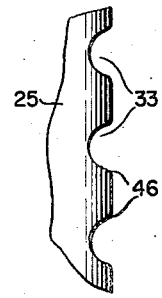
Figure 4 is a fragmentary side elevational view of one of the sections of the handle taken on a much magnified scale.
Figure 5:
Figure 5 is an enlarged cross sectional view taken on the line 5—5 through the extra knife carried by the butt of the tool.
Figure 17:
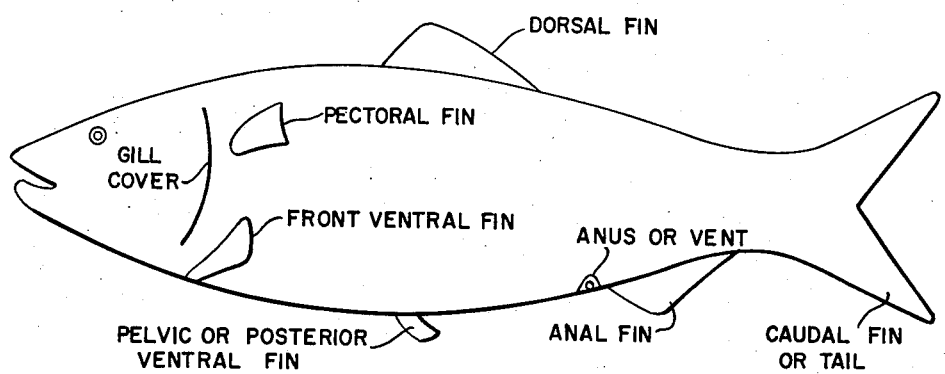
Figure 17 is a side schematic view of a form of fish upon which the process and tool of this invention is designed to work.

As shown more particularly in Figure 4 the notches 33 preferably have rounded corners 46.

Referring more particularly to Figures 15 and 16 resilient binding rings 47 and 48 are provided. In Figure 15 the large binding ring 47 is shown as comprising spaced substantially parallel detent bars 49 and 50 which are relatively movable toward and from each other. Connecting these detent bars 49 and 50 at their opposite edges are outwardly-looped side bars 51 and 52.

The resilient binding ring 48, as shown in Figure 16 is similarly constructed of spaced parallel detent bars 53, 54 and side or outwardly looped bars 55, 56.

The loops 51, 52 and 55, 56 tend to flatten out as the detent bars 49, 50 and 53, 54 move apart.

Figure 2:
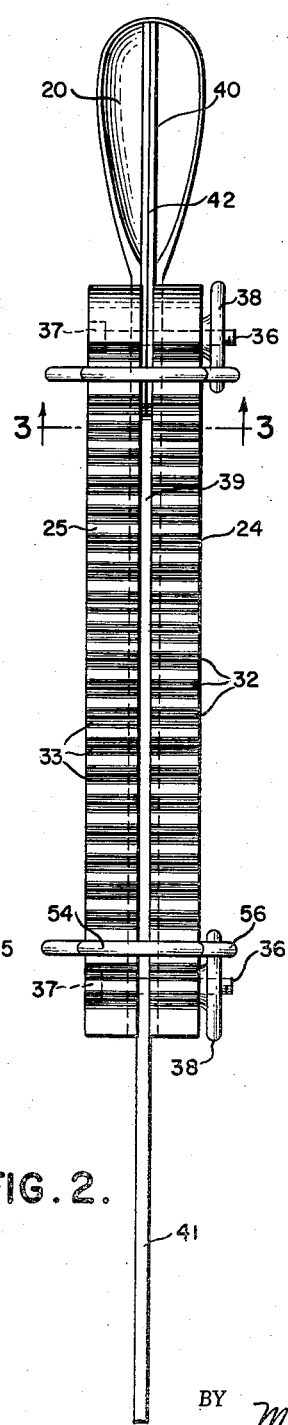
Figure 2 is a front elevational view of the same.
Figure 3:
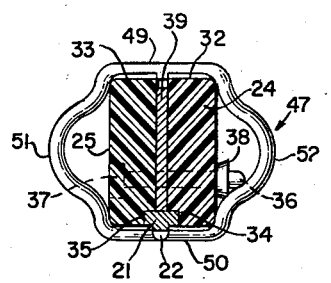
Figure 3 is an enlarged cross sectional view taken on the line 3—3 in Figure 2.

Referring more particularly to Figures 1, 2 and 3, the tool is assembled by placing the tang 39 of the cutting tools between the handle sections 24 and 25, after which the bolts 36 are entered in the various bolt holes of the handle and through the slots 44 and 45 of the cutting implement. The nuts 38 are then run up tightly on the bolts thus clamping the handle sections 24, 25 upon the cutting implement. By loosening the nuts 38 the cutting implement may be slid up and down between the handle sections adjusting its position relatively to the handle sections and to the spoon. After the adjustment is effected the nuts 38 are tightened and the cutting tool is held firmly in place. Before or after this tightening operation the shank 21 of the spoon may be placed in the groove provided by the recesses 34, 35 which are now moved closely together. The spoon shank 21, however, will be able to slide longitudinally in this groove 34, 35 and thus to adjust its position with respect to the handle and blade 40 in a longitudinal direction. It will be noted that the dimensions cross sectionally of the groove 34, 35 are such as to accommodate the shank 21 with the rib 22 outstanding therefrom so as to expose the notches 23 in a tapering line down the left side of the handle. This position will be assumed with the concavity of the bowl 20 facing the blade 40. The relative inclinations at which the spoon bowl 20 is held by virtue of the tapering groove 34, 35 and the formation and positioning in the handle of the tang 39 and its upper blade 40, as shown in Figure 1, the butt end of the blade 40 may lap to some extent into the bowl of the spoon with its outer tip end resting against or close to the uppermost central wall of the spoon so that the knife blade 40 intercepts the longitudinal central line of the concavity of the spoon 20 as more particularly appears from Figure 2.

When the parts have thus been assembled the large binding ring 47 is first introduced over the butt end of the handle and moved upwardly thereon with its detent bars 49 and 50 engaging the opposed notches 23 and 33 of the spoon shank 21 and handle sections 24, 25. The dimensions of the ring 47 are such that the same will permit the ring to pass to an upper portion of the handle but will not allow the ring to pass off the upper larger end of the handle. As a matter of fact, the resilient ring 47 must undergo some considerable expansion before it reaches the position illustrated in Figure 1. The progressively enlarging tapered side edges of the handle cause this expansion with the side bars flattening out at the loops 51 and 52 and consequently putting the ring 47 under considerable internal elastic stress which reacts in an endeavor to move the detent bars 49 and 50 back towards one another and in so doing these detent bars snap into the notches 23, 32 and 33 presented to them at any particular time incident to the progress of the resilient ring 47 along the handle.

In like manner, the lower smaller resilient ring 48 is introduced over the butt end of the handle and its dimensions are such that they will not permit this ring to ascend to any great linear longitudinal extent along the handle, but the ring 48 will rapidly reach its elastic limit so that it will remain at the lower portion of the handle to bind the spoon shank to the handle at the lower or butt end as well as at the upper or spoon end. The interior spaces provided by the loops 51, 52 and 55, 56 afford clearance over the nuts 38. These loops also provide outstanding parts of the side bars which afford grips to the hands of the operator for forcibly pushing the rings 47 and 48 along the handle.

The tool may be readily dismantled by removing the rings 47 and 48 downwardly of the handle and eventually off the butt end thereof whereupon the nuts 38 and bolts 36 may be withdrawn to permit the spoon to be removed, the handle sections separated and the cutting tool exposed for removal.

The process of this invention may be performed according to at least two methods.

In practicing the first method, as an initial step the fish is held firmly in the area of the gill cover. The second step is to remove the vent by cutting from the back to the front.

Figure 18:
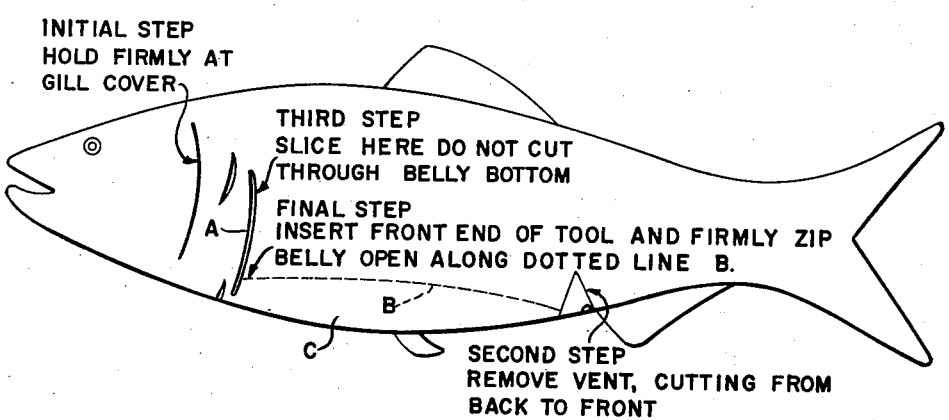
Figure 18 is a similar view bearing incision lines and data illustrating the steps of carrying out the process.

The third step is to slice the fish on the transverse line A just back of the pectoral fin and front ventral fin. Care should be exercised not to cut through belly bottom. The next step is to cut along the line B of Figure 18. The tool as described herein is particularly adapted for this purpose. The knife 40 is inserted at the front end of the line B near the base of the incision A. From this point the knife is moved rearwardly along the line B to approximately the area of the removed vent.

The fish is thereupon turned to its other side and the incisions along lines A and B also made in the sequence described or in other sequence. Thereupon the bottom of the belly is lifted from back to front leaving belly cavity wide open for easy removal of perfect set of roe cut only where it is attached to the body at vent. Small belly bottom will still be attached to the carcass.

The second method, which is recommended to commercial operators or when the fish carcass is to be saved, consists as a first or initial step in removing the vent with a deep wedge cut from back to front. The pelvic fin, if any, is now removed with a shallow cut from back to front being careful not to enter belly cavity which would damage the roe. This is best done by holding the fish belly up. Still holding fish belly up, the front ventral fin is lifted and the operator will slice into belly forward and toward pectoral fin for approximately one and one-half inches depending on the size of fish. This cut should go through the liver of the fish but not touch the roe. The front end of the tool is now inserted at the opening at the ventral line and the tool is firmly moved to opening at vent in order to make an incision along this line. The operator will now spread the sides of the fish belly with one hand and remove the perfect roe with the other hand. It is advisable to do this gently as the capsule of the roe is very tender.

Care should be exercised to hold the tool handle down and the spoon tip-front up with firm lifting pressure. The belly opening stroke should be performed very quickly. The spoon of tool pushes the roe away from the cutting blade completely effectively.

Although I have disclosed herein the best form of the invention known to me at this time, I reserve the right to all such modifications and changes as may come within the scope of the following claims.

What is claimed is:

1. The herein described process which consists in holding a fish firmly at its gill cover section only, then while so holding first removing the vent by cutting from back to front, then secondly slicing the fish laterally just back of the pectoral and front ventral fins, and thirdly ripping the belly open along a longitudinal line above the bottom of the belly from a point just above the front ventral fin backwardly to the area of the removed vent, turning fish on other side and repeating the foregoing steps, and subsequently lifting the bottom of belly from back to front leaving cavity wide open for easy removal of roe intact.

2. The herein described process which consists in removing the vent of a fish with a deep wedge cut from back to front, removing pelvic fin with shallow cut from back to front while holding fish belly up, lifting front ventral fin and slicing into belly forward and toward pectrol fin to a depth to go through liver, firmly ripping belly open from the opening previously made at the ventral line to opening at the vent, spreading sides of fish belly and removing roe intact.

3. A process for removing roe from shad or the like fish comprising removing the vent, exposing the roe by making a ventral incision between the region adjacent the front ventral fin and the region adjacent the pectoral fin, and making an incision between the removed vent area and the area between the front ventral and pectoral fins, and lifting out the roe from the belly cavity.

References Cited in the file of this patent

UNITED STATES PATENTS 2,234,658   Smith _____ Mar. 11, 1941